United States Patent

[11] 3,634,757

| [72] | Inventor | Alexandre Monomakhoff<br>Verneuil-en-Halatte, France |
|---|---|---|
| [21] | Appl. No. | 808,251 |
| [22] | Filed | Mar. 18, 1969 |
| [45] | Patented | Jan. 11, 1972 |
| [73] | Assignee | Charbonnages De France<br>Paris, France |
| [32] | Priority | Mar. 21, 1968 |
| [33] | | France |
| [31] | | 144,784 |

[54] MEASURING BRIDGE HAVING A TEMPERATURE-COMPENSATING TRANSISTORIZED VOLTAGE STABILIZER SHUNTING THE POWER SUPPLY TO THE BRIDGE
2 Claims, 1 Drawing Fig.

[52] U.S. Cl. .................................................. 324/65 TC,
73/27, 323/81, 324/105
[51] Int. Cl. ..................................................... G01r 27/02,
G01r 5/22
[50] Field of Search ............................................. 324/65,
105, 65 B, 65 TC; 323/69, 8, 79, 81; 73/27

[56] References Cited
UNITED STATES PATENTS

| 3,207,984 | 9/1965 | Tolliver .......................... | 324/105 |
| 3,278,834 | 10/1966 | Perino .......................... | 324/105 X |
| 3,495,159 | 2/1970 | Smith ............................ | 324/105 X |
| 2,906,941 | 9/1959 | Brolin ........................... | 323/81 X |
| 3,091,957 | 6/1963 | Hampton ...................... | 73/27 |
| 3,440,515 | 4/1969 | Swartz .......................... | 323/8 X |
| 3,535,613 | 10/1970 | Katzenstein .................. | 323/8 X |

*Primary Examiner*—Rudolph V. Rolinec
*Assistant Examiner*—Ernest F. Karlsen
*Attorney*—Karl W. Flocks ABSTRACT: A direct-current supply circuit for apparatus of the type in which a measuring bridge is provided comprising at least one electric dosing filament, the resistance of which is a function of a value to be measured. The said circuit comprises a source of direct current of regulated intensity connected in series with the measuring bridge and a shunt voltage stabilizer circuit with transistors, connected directly to the terminals of the measuring bridge and which shunts at any moment the desired portion of the supply current of regulated intensity, so that the voltage at the terminals of the bridge is maintained at the desired value.

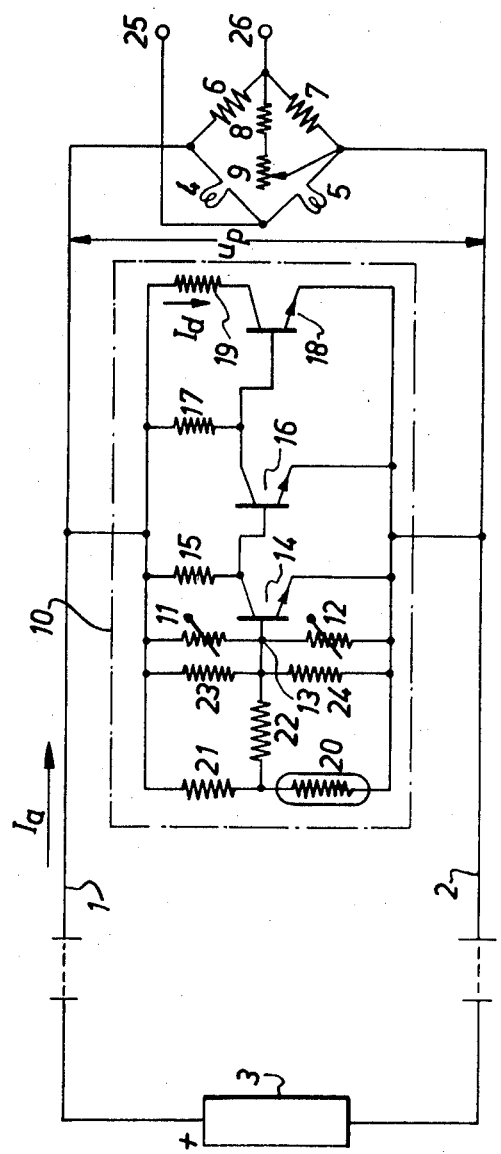

MEASURING BRIDGE HAVING A TEMPERATURE-COMPENSATING TRANSISTORIZED VOLTAGE STABILIZER SHUNTING THE POWER SUPPLY TO THE BRIDGE

The present invention is applicable to apparatus in which the temperature of elements heated by the Joule effect is dependent on a value to be measured, the said temperature being determined by the measurement of the value of the resistance of the heated element.

It is more particularly applicable to instruments for measuring the content of combustible gas in the atmosphere by means of catalytic combustion of the combustible gas on an active filament (or dosing filament) or in the vicinity of this latter, its resistance being compared with that of an inactive filament (or compensating filament) or of a resistance element of fixed value.

In general, the dosing filament and the compensator filament (or the resistance element) are connected in series and form one of the two arms of a Wheatstone bridge, the other arm of which is constituted by two fixed resistances having values proportional respectively to the dosing filament on the one hand and to the compensating filament (or to the resistance element) on the other, the bridge thus formed being supplied with alternating current or direct current.

Various means of supplying direct current to a measuring bridge of this kind are already known.

Some of these utilize a source of substantially constant voltage, such as a dry cell or a battery. Others employ a source of direct current of regulated intensity.

In addition, it has long been known that the life of dosing filaments for catalytic combustion of combustible gas is longer when the filaments are supplied at a substantially constant voltage applied to their terminals. To this end, the most generally employed method of operation consists of adjusting the voltage applied to the bridge to a given value when the dosing filament is placed in pure air, by means of a resistance connected in parallel with the bridge and the value of which is adjusted in such manner that the voltage applied to the bridge has a suitable value.

This long and tedious operation must be carried out for each measuring bridge and in the presence of the bridge, and whenever one of the elements of the bridge is changed.

The present invention relates to a simple device for supplying direct current to a measuring bridge comprising a dosing filament the resistance of which is a function of a value to be measured, the said device being characterized in that it comprises, in combination:

a source of direct current of regulated intensity, connected in series with the measuring bridge;

and a shunt voltage stabilizer circuit with transistors, connected directly to the terminals of the measuring bridge, in which the output of the final transistor is fixed by the potential of the common point of two adjustable resistances connected in series to the terminals of the supply diagonal of the measuring bridge.

The invention is also directed, by way of new industrial products to the apparatus and the measuring installations acting by the determination of the temperature of at least one filament, the heating of which by the Joule effect is ensured by the utilization of the device specified above and in particular the fire-damp meters equipped with the said device.

Other characteristic features and advantages of the present invention will be brought out in the description which follows below, given with reference to the accompanying drawing, representing, by way of example, a measuring bridge of the type defined in the foregoing description, equipped with a form of construction of the direct-current supply circuit according to the invention.

In this drawing, 1 and 2 represent the conductors connecting the direct-current supply source 3 having a constant intensity $I_a$ to the Wheatstone bridge constituted by a dosing filament 4, a compensator filament 5, fixed resistances 6, 7 and 8 and a balancing potentiometer 9.

According to the invention, a voltage-stabilizing electronic circuit 10 is connected directly to the terminals of the feed diagonal of the Wheatstone bridge.

The electronic circuit 10 comprises essentially, from the upstream to the downstream sides in the direction going from the source 3 to the Wheatstone bridge, and connected between the conductors 1 and 2:

a voltage divider bridge composed of two variable resistances 11 and 12 having a common point 13 which constitutes the center point of the said divider;

the emitter-collector circuit of a transistor 14, the load resistance of which is at 15, while the base is directly connected to the point 13;

the emitter-collector circuit of a transistor 16, the load resistance of which is at 17, while the base is directly connected to the collector of the transistor 14;

and the emitter-collector circuit of a transistor 18, the load resistance of which is shown at 19, while the base is directly connected to the collector of the transistor 16, the three transistors being of the same type, NPN in the example shown.

The voltage-stabilizing circuit 10 is compensated for temperature by means of the thermistor 20, the action of which is set by means of the fixed resistances 21, 22, 23 and 24.

The polarization of the transistor is set by means of the variable resistances 11 and 12, in such manner that the base current of 14 amplified by the transistor 16 gives the transistor 18 the suitable resistance so that the voltage $U_p$ at the terminals of the Wheatstone bridge attains the desired value $U_a$.

In other words, the transistor 18 is a shunt of variable value, as will be seen below, which shunts at any moment a portion $I_d$ of the supply current regulated to the value $I_a$, so that the voltage at the terminals of the bridge is equal to $U_a$. If the apparent resistance of the measuring bridge increases, either due to wear of the dosing filament, or due to the presence of the combustible gas, the content of which it is desired to measure, the voltage $U_p$ existing at the terminals of the measuring bridge has a tendency to increase since the unit is supplied at a constant current intensity $I_a$.

The potential of the point 13 has a tendency to increase, together with the base current and the collector current of the transistor 14, which, after amplification by the transistor 16, results in a diminution of the emitter-collector resistance of the transistor 18 and an increase in the value of the current $I_d$, until a fresh balance is obtained for which $U_p = U_a$.

The voltage-stabilizing circuit 10 carries out its purpose irrespective of the value of the voltage which appears at the terminals of the bridge or, which amounts to the same thing, between the emitter of the transistor 18 and the extremity of the resistance 19, insofar as the value of this voltage is comprised in the range of regulation of the circuit 10.

For this reason, it is possible to regulate the circuit 10 with a resistance element other than the measuring bridge, for example an ohmic resistance, having a resistance value substantially equal to that offered by the measuring bridge when the dosing filament is immersed in pure air. The initial adjustment of the circuit 10 being effected, the replacement of the measuring bridge by a bridge having equivalent characteristics, or the replacement of an element of the bridge (the dosing filament for example) by an identical element has no influence on the initial adjustment of the bridge.

It is clear that the supply device according to the present invention may be utilized equally well in compact apparatus as in installations in which the measuring bridge is located at a place remote from the source 3 and from the apparatus indicating or recording the unbalance voltage of the measuring bridge available at the terminals 25 and 26 of the bridge, as is the case for fire-damp telemetry installations.

In this latter case, the use of a source of direct current at regulated intensity offers the further advantage of eliminating the effect on the measurement of variations in the length of the line and the influence of bad contacts due in particular to connectors which may be placed between the source 3 and the measuring bridge.

Tests carried out by the applicants have shown that by varying the value of a resistance simulating the bridge filament by ±13 percent resulted in a voltage variation at its terminals of only ±1.2 percent, which corresponds to a rate of regulation of the order of 10.

Furthermore, variations of ±3 percent in the value of the regulated supply current resulted in variations of only ±0.1 percent of the voltage at the terminals of the resistance simulating the measuring bridge, which corresponds to a rate of regulation of the order of 30.

I claim:

1. An apparatus of the fire-damp detector type having a measuring bridge equipped with at least one electric dosing filament, the resistance of which is a function of a value to be measure, comprising:
   a source of direct current of regulated intensity;
   said source being connected in series with said measuring bridge;
   and a shunt-voltage-stabilizing circuit with transistors; said stabilizer circuit being connected directly to the supply terminals of said measuring bridge and being constituted at least by:
   a voltage divider with two variable resistances having a common point and connected in series to the supply terminals of said measuring bridge;
   a transistor stage having a load resistance with its base connected to said common point of said voltage divider, said transistor stage having an end of said load resistance and an electrode connected to the supply terminals of said measuring bridge;
   and a temperature-compensating resistance means including a temperature-compensating resistance and at least one additional resistance having a point in common and connected in series across the supply terminals of said measuring bridge, said point in common being connected by a further resistive means to the base of said transistor stage.

2. A direct-current supply circuit for measuring bridge apparatus provided with at least one electric dosing filament, the resistance of which is a function of a value to be measured, comprising
   a source of direct current at regulated intensity connected in series with the measuring bridge apparatus;
   and a voltage-stabilizing circuit connected to the supply terminals of said measuring bridge and including
   a voltage divider with two variable resistances having a common point and connected across the supply terminals of said measuring bridge,
   a first transistor stage having a load resistance with its base connected to said common point of said voltage divider,
   at least one additional transistor stage having a load resistance and its base connected to the previous stage,
   said transistor stages each having an end of said load resistance and an electrode connected to the supply terminals of said measuring bridge,
   and a temperature-compensating resistance means including a temperature-compensating resistance and at least one additional resistance connected across the supply terminals of said measuring bridge and to the base of said first transistor stage.

* * * * *